Aug. 15, 1967  J. E. GRAHAM  3,335,949
CASH REGISTER

Filed Aug. 11, 1964  15 Sheets-Sheet 1

INVENTOR.
JOHN E. GRAHAM
BY Charles R. Miranda
ATTORNEYS

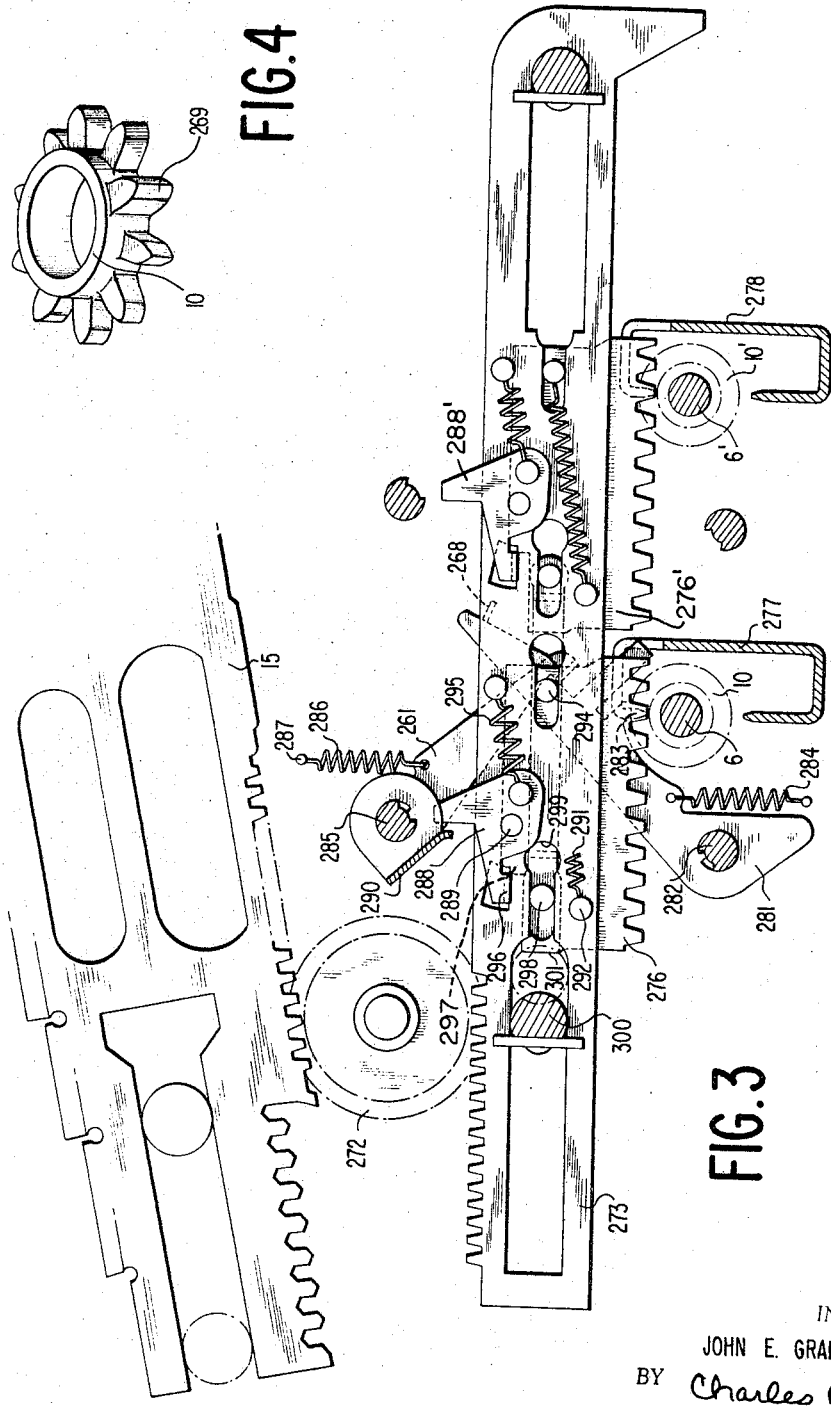

Aug. 15, 1967   J. E. GRAHAM   3,335,949
CASH REGISTER
Filed Aug. 11, 1964   15 Sheets-Sheet 3

INVENTOR.
JOHN E. GRAHAM
BY Charles R. Miranda
ATTORNEYS

Aug. 15, 1967

J. E. GRAHAM 3,335,949

CASH REGISTER

Filed Aug. 11, 1964

INVENTOR.
JOHN E. GRAHAM
BY Charles R. Miranda
ATTORNEYS

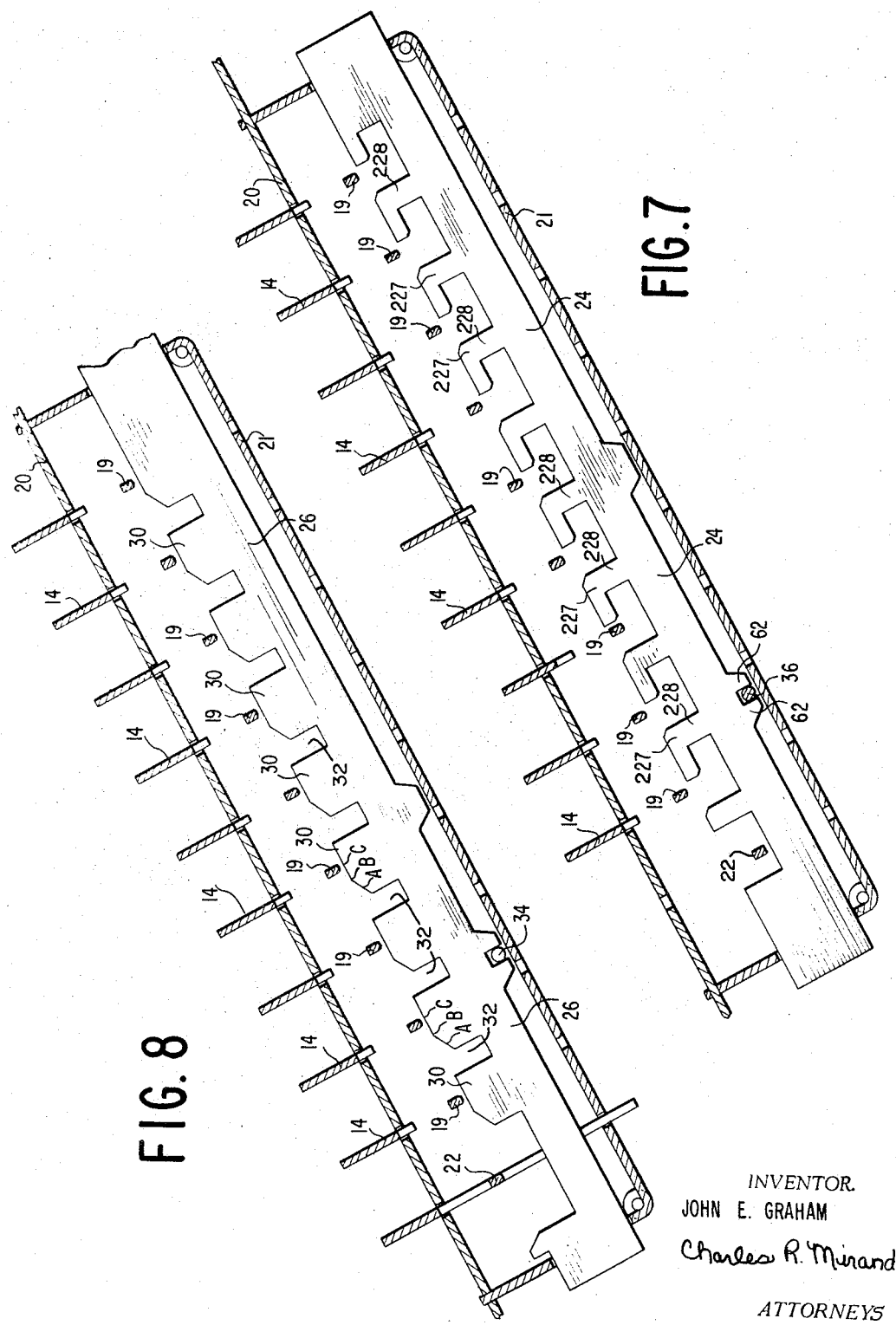

Aug. 15, 1967   J. E. GRAHAM   3,335,949
CASH REGISTER
Filed Aug. 11, 1964   15 Sheets-Sheet 6
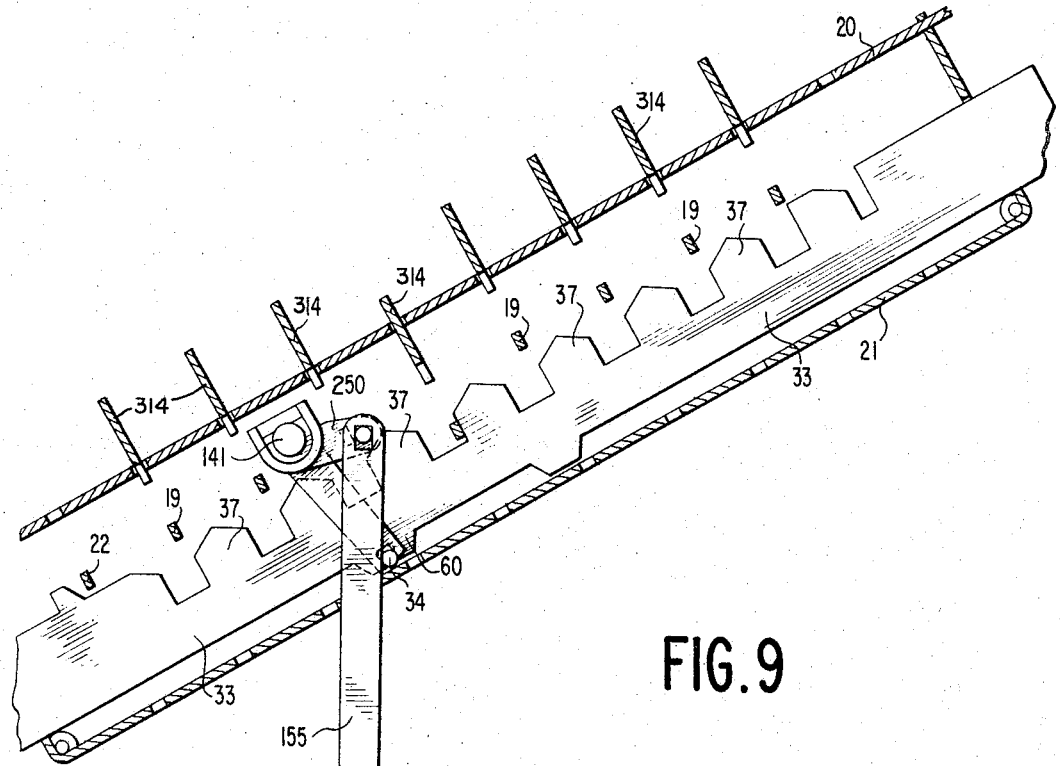
FIG. 9
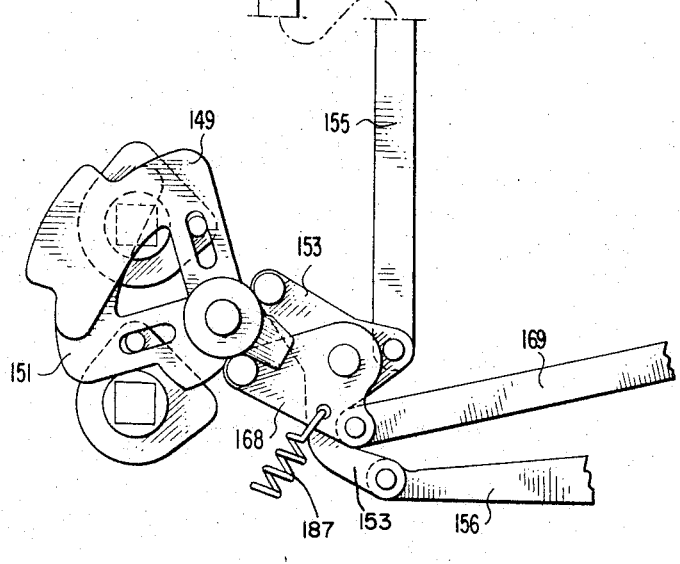
INVENTOR.
JOHN E. GRAHAM
BY Charles R. Miranda
ATTORNEYS Aug. 15, 1967  J. E. GRAHAM  3,335,949
CASH REGISTER
Filed Aug. 11, 1964
15 Sheets-Sheet 7
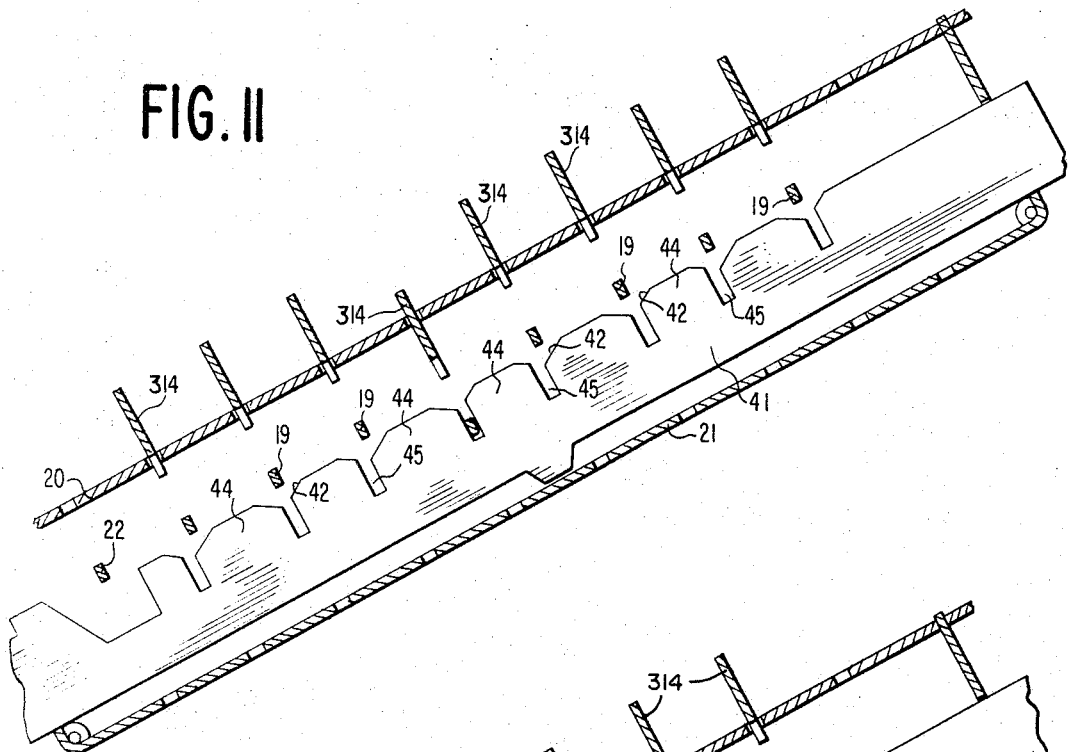
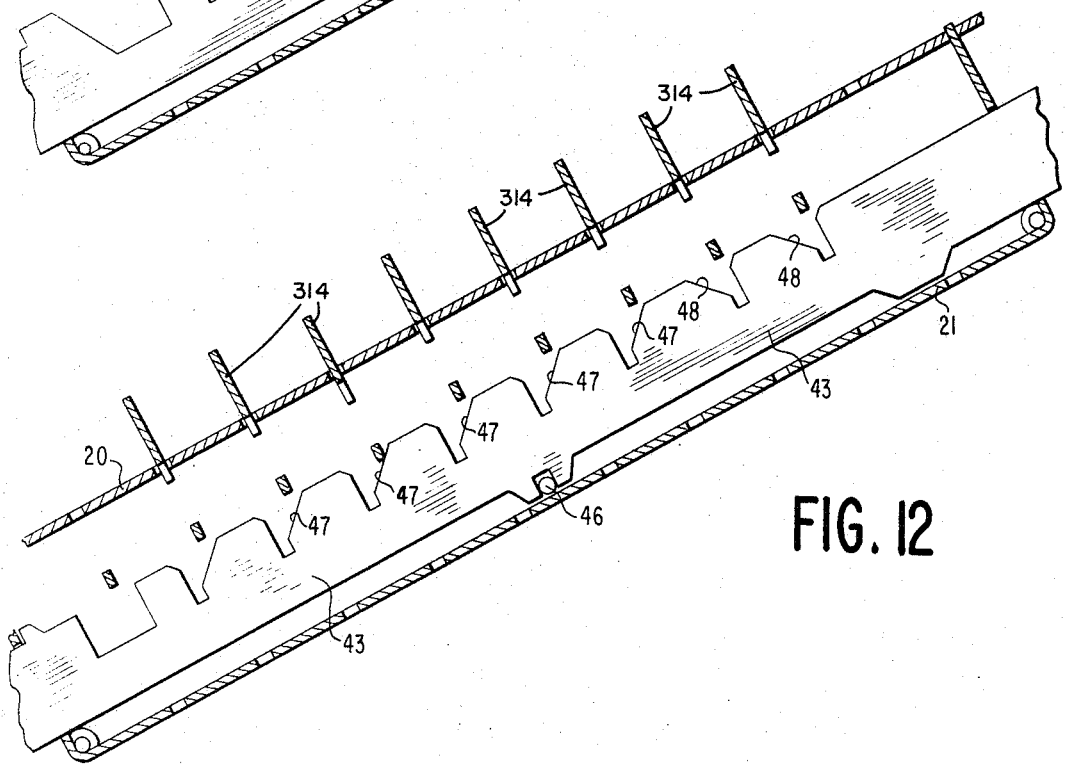
INVENTOR.
JOHN E. GRAHAM
BY Charles R. Miranda
ATTORNEYS INVENTOR.
JOHN E. GRAHAM
BY Charles R. Miranda

ATTORNEYS

Aug. 15, 1967 J. E. GRAHAM 3,335,949
CASH REGISTER
Filed Aug. 11, 1964 15 Sheets-Sheet 9
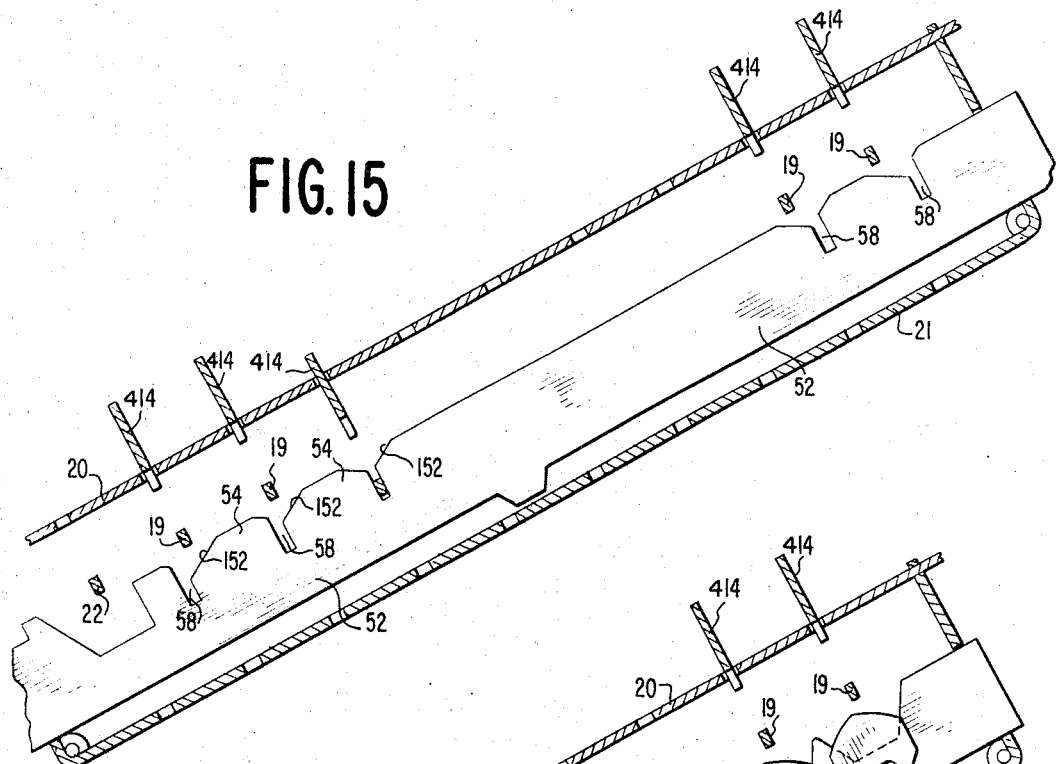
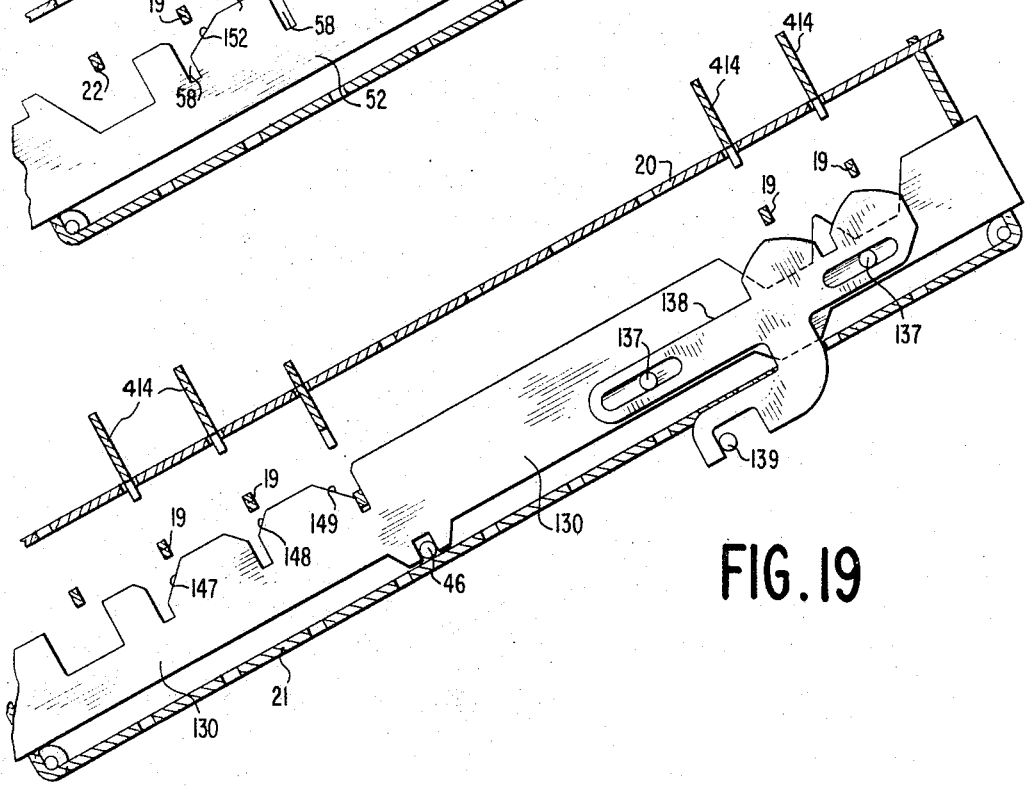
INVENTOR.
JOHN E. GRAHAM
BY Charles R. Miranda
ATTORNEYS

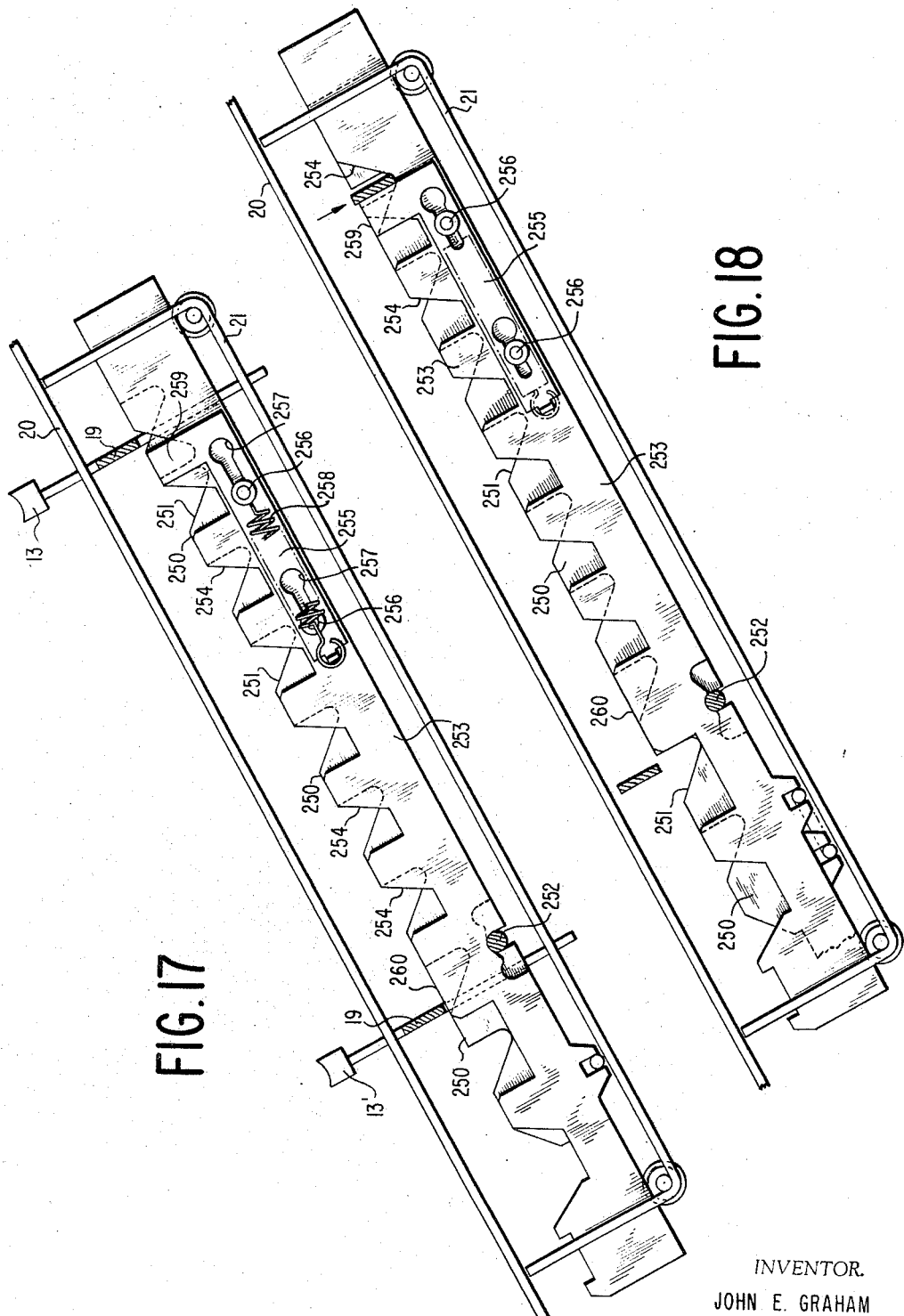

Aug. 15, 1967   J. E. GRAHAM   3,335,949
CASH REGISTER

Filed Aug. 11, 1964   15 Sheets-Sheet 11

INVENTOR.
JOHN E. GRAHAM
Charles R. Miranda
ATTORNEYS

Aug. 15, 1967  J. E. GRAHAM  3,335,949
CASH REGISTER

Filed Aug. 11, 1964

INVENTOR.
RICHARD E. BUSCH
BY Charles R. Miranda
ATTORNEYS

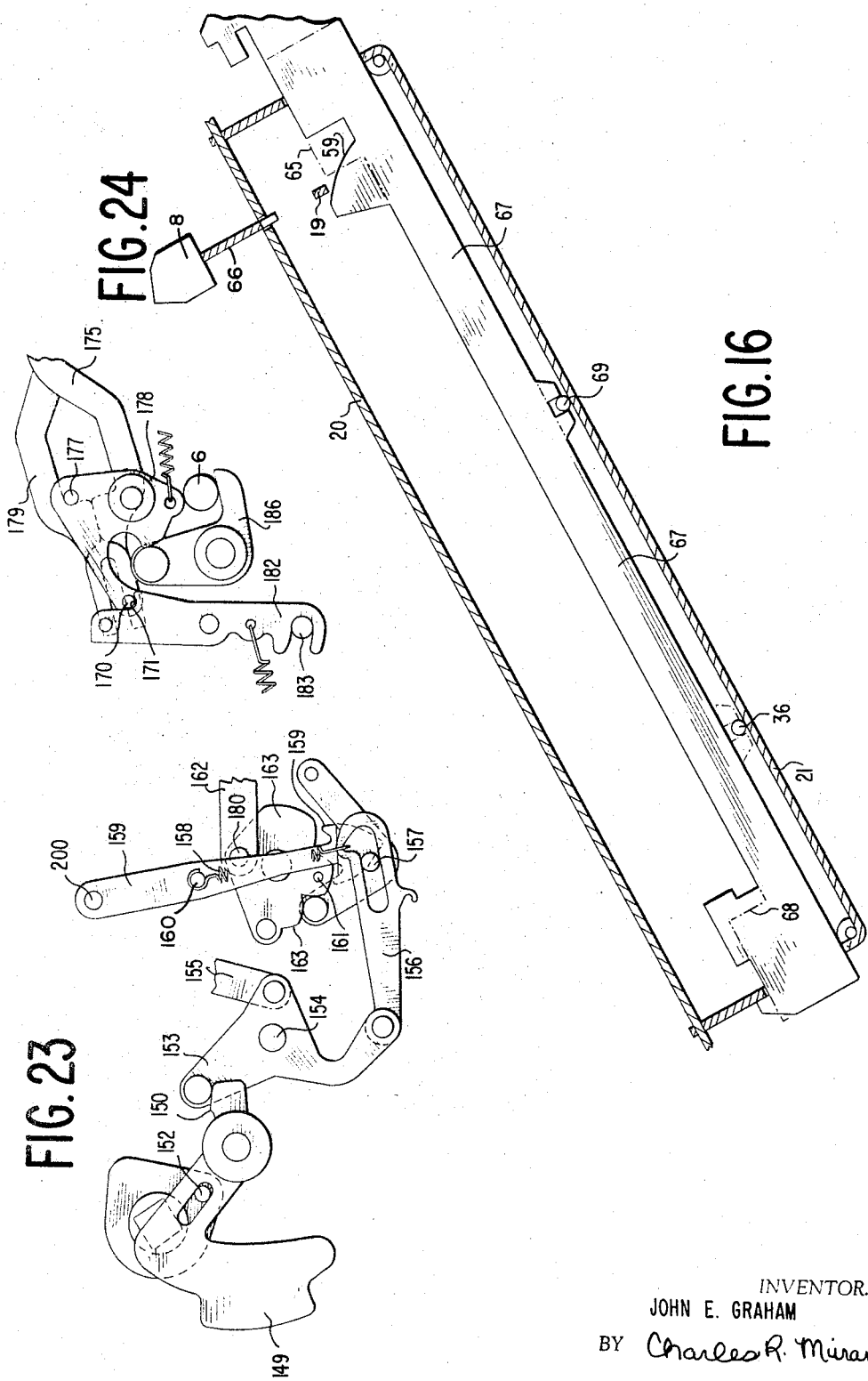

Aug. 15, 1967 J. E. GRAHAM 3,335,949
CASH REGISTER

Filed Aug. 11, 1964 15 Sheets-Sheet 15

INVENTOR.
JOHN E. GRAHAM
BY Charles R. Miranda
ATTORNEYS

United States Patent Office 3,335,949
Patented Aug. 15, 1967

3,335,949
CASH REGISTER
John E. Graham, Huntington Beach, Calif., assignor to Sperry Rand Corporation, New York, N.Y., a corporation of Delaware
Filed Aug. 11, 1964, Ser. No. 388,899
7 Claims. (Cl. 235—130)

The present invention relates in general to calculating machines and more particularly relates to a multi-accumulator cash register calculating machine, such as utilized in the business world to facilitate sales transactions.

The present invention relates more specifically to improvements in a calculating machine such as disclosed in application Ser. No. 388,901 filed Aug. 11, 1964, in the name of Richard E. Busch. However, no provision was made in this machine for providing a proper interlocking of the "no sale" key such that depression of this key could be effected only after a totalling operation.

It is therefore an object of the instant invention to provide a machine of the type described in which proper interlocking control between each of the control keys of the machine for each operation thereof is automatically effected.

It is another object of the instant invention to provide interlocking control between the "no sale" key and the "change-balance due" key in a machine of the type described so as to prevent depression of the "no sale" key until a totalling operation has been performed.

These and other objects, features and advantages of the present invention will become more obvious from the following description when taken in connection with the accompanying drawings which show, for purposes of illustration only, one embodiment in accordance with the present invention, and wherein:

FIGURE 3 is a plan view of the tens transfer which is designed to cooperate with the secondary accumulator positioning mechanism of the instant invention;

FIGURE 4 is a detail perspective illustrating an accumulator element of the type utilized with the mechanism of FIGURE 3;

FIGURE 7 is a side section of the keyboard illustrating a full stroke control slide;

FIGURE 8 is a side section of the keyboard illustrating an amount interlock slide;

FIGURE 9 is a side section of the keyboard illustrating a department interlock slide;

FIGURE 11 is a side section of the keyboard illustrating a department interlock slide;

FIGURE 12 is a side section of the keyboard illustrating a department itemizer control slide;

FIGURE 15 is a side section of the keyboard illustrating a function interlock slide;

FIGURE 16 is a side section of the keyboard illustrating a zero stop control and clear key slide and a clear key locking slide;

FIG. 17 is a side section of the keyboard illustrating a "no sale" interlock control slide and a "balance due" interlock control slide in one position;

FIGURE 18 is a side section of the keyboard illustrating the "no sale" and "balance due" interlock control slides in another position;

FIGURE 19 is a side section of the keyboard illustrating a change computer slide;

FIGURE 23 illustrates a portion of the positioning mechanism of FIGURE 22 in an actuated position;

FIGURE 24 illustrates another portion of the positioning mechanism of FIGURE 22 in an actuated position;

The mechanisms which provide for digitation and selection of the secondary accumulators provided in this multi-accumulator machine are as specifically shown and described in copending application Ser. No. 388,901 in the name of Richard E. Busch, filed Aug. 11, 1964. Other well-known details of the machine not a part of the invention may, for example, take the form disclosed in the Robert E. Boyden, Patent No. 2,583,810, issued on Jan. 29, 1952, and the Edward P. Drake, Patent No. 2,472,696, issued on June 7, 1949, which relate to the well-known Clary adding machine. Therefore, in the interests of clarity, only those portions of the machine which relate to the present invention or cooperate directly therewith will be illustrated and described herein. However, it should be understood that the invention may be equally well applied to other types of calculating and registering machines than disclosed in the above-mentioned patents and patent applications without departing from the spirit and scope of the instant invention.

Figure 1:
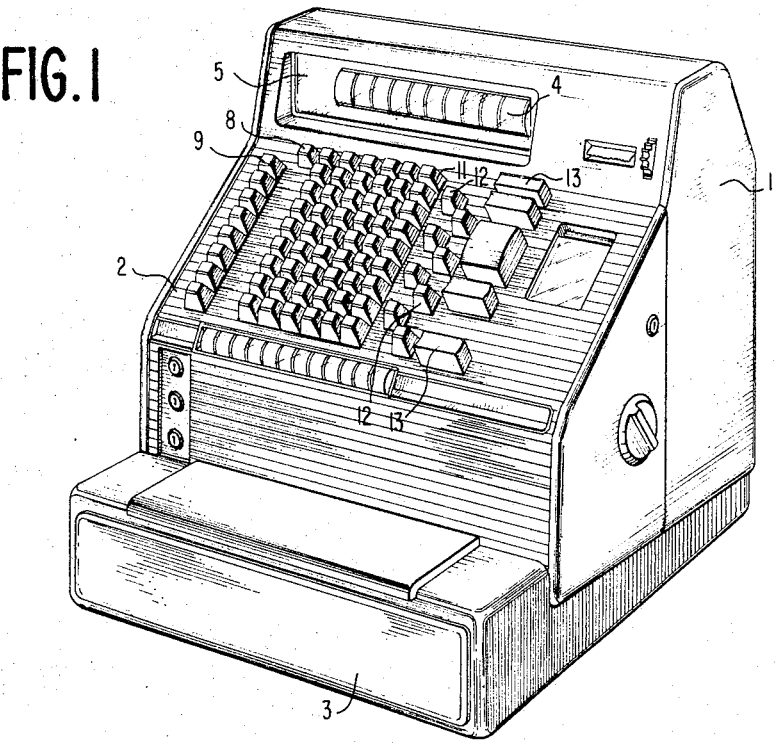
FIGURE 1 is a perspective view of a calculating machine of the type into which the instant invention may be incorporated.

The machine comprises in general, as seen in FIGURE 1, a main cover 1 which includes a keyboard 2 providing the various control keys which effect operation of the machine through desired selected functions. A cash drawer 3 is provided at the lower portion of the machine for retaining cash and other bills, and above the keyboard 2 there is provided a dial system 4 visible through window 5, which indicates the amounts involved in each transaction of the machine along with other pertinent information.

The keyboard 2 contains a first column of keys 9 on the left side thereof which provide for general identification of the operator by means of a letter of the alphabet. No accumulator is provided for this column since no digitation is required for identification. The next column is empty of keys except for an amount release key 8, which controls the depressed amount keys so as to provide selective release thereof without initiating a machine cycle.

Amounts are entered into the machine by way of amount keys 11 which are provided in six columns, each column containing nine keys representing each of the primary digits. Two columns are provided adjacent the amount keys 11 for a plurality of department keys 12, which like the identification keys 9 do not digitize an accumulator but serve to select the type of digitation which will occur in the amount section. The right-hand column on the keyboard 2 provides the function keys 13, which, for example, may include a change balance due and no sale key, a total key, an add or grocery key, etc.

The computing mechanism of the machine is motor driven and includes a cyclically operable main cam shaft 31 (FIGURE 2), driven by a cyclic clutch (not shown) under control of the department keys 12 and the function keys 13, depression of any of which will initiate a cycle of operation of the machine.

Figure 2:
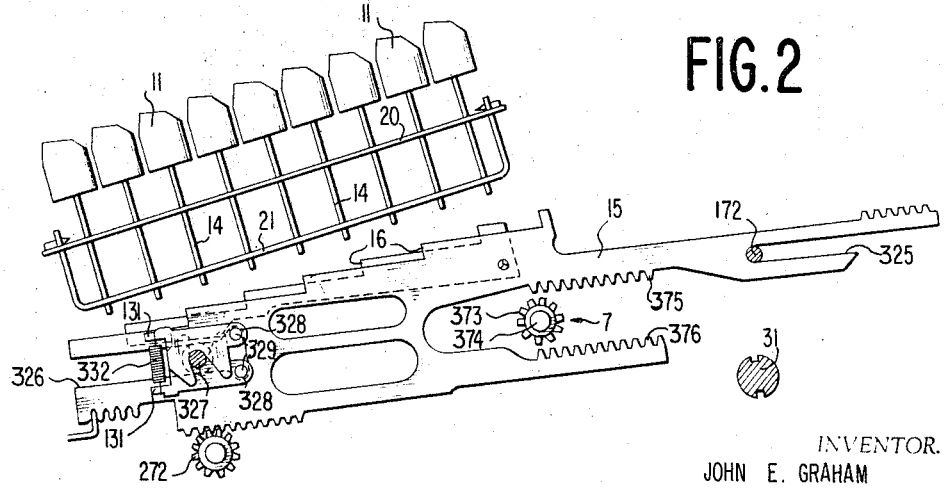
FIGURE 2 is a longitudinal section of the machine illustrating the racks, keyboard and associated elements.

FIGURE 2 shows the general construction of the keyboard which is substantially identical to the basic keyboard mechanism in the well-known "Clary" adding machine. Each of the amount keys 11 of the keyboard includes a key stem 14 guided for vertical movement in aligned slots formed in keyboard frame plates 20 and 21. The lower edges of the key stems cooperate with spaced shoulders 16 formed on aligned racks 15 to limit the forward advancement of each rack to a number of increments corresponding to the numerical value of the key depressed.

Spring means (not shown) are provided for normally holding the keys in raised position and means associated with the keyboard control slides are further provided for latching each key in rack arresting position upon depression thereof. A zero stop (not shown) which arrests each associated accumulator rack 15 and which is released by depression of any key in the respective column is also provided.

Means (not shown) associated with the main cam line are provided for yieldably advancing the racks 15 during the first half of a machine cycle and for returning them to their home positions after a printing operation and during the latter half of the machine cycle. The racks are provided with slots 125 and 126 which are slidably guided over support shafts 72 and 127, respectively. The shaft 127 is slidably mounted in suitable guide slots (not shown) in the frame of the machine.

In order to yieldably advance the various racks, each rack has opposed notches 328 located at the closed end of its slot 326, the notches being normally engaged by rollers 329 carried by pawls 131 pivotally mounted on the shaft 327. A tension spring 332 extends between each pair of pawls so as to urge the latter outwardly and thus hold the rollers 329 in driving engagement with the notches 328, thereby yieldably advancing any racks which are otherwise free to do so. When any one of the racks 15 is arrested at shoulder 16 by a depressed amount key stem or by a zero stop (not shown), the rollers 329 will ride out of the notch 328 of the blocked rack and along the edge of the slot 326.

The primary accumulator 7 is basically disclosed in the aforementioned Drake Patent No. 2,472,696. Reference may be made to said patent to a complete disclosure of details of the accumulator not specifically shown herein. In general, the primary itemizing accumulator 7 comprises a plurality of accumulator gears 373 independently mounted on an accumulator shaft 374. For the purposes of raising the accumulator 7 from its neutral position shown in FIGURE 2 into its upper position when the accumulator gears 373 mesh with the upper rack gear sections 375 of the associated racks or lowering the unit wherein the gears 373 mesh with the rack gear sections 376, the present invention provides an accumulator positioning mechanism which will be described in greater detail in conjunction with FIGURE 19.

The machine embodying the instant invention is also provided with a plurality of department accumulators 10 and 10' (FIGURE 3) which are digitized on the return stroke of the upper rack 15. The accumulators 10 and 10' are positioned on shafts 6 and 6', respectively, with four accumulators provided on each shaft for each amount column. The manner in which an individual accumulator is selected for digitation during a given cycle of operation is disclosed in aforementioned copending application Ser. No. 388,900.

The department accumulators are digitized by a lower accumulator rack 273 positioned in each amount column (FIGURE 3). The main accumulator rack 15 digitizes the itemizing accumulator 7 of the reversible type on its forward stroke to the left and also, through an idler gear 272, drives lower main rack 273 on its initial stroke to the right. The rack 273 has slidably mounted on the other side thereof a transfer rack 276, which serves to digitize the department accumulators 10 and 10'. During the forward stroke of the upper rack 15 and corresponding initial stroke of the lower rack 273, the lower accumulators 10 and 10' are retained in their neutral position in engagement with their respective detent bars 277 and 278. During the latter half cycle of machine operation and before the racks 15 begin their homeward stroke, one of the accumulator shafts 6 or 6', or both, depending upon the department key selected, will raise the associated accumulator gear from its detent bar and into mesh with the transfer rack 276 and/or 276'.

As the rack 15 begins its homeward stroke, the lower transfer rack 276 will digitize its respective accumulator gear. It should be noted that the lower accumulators are digitized on the back stroke of the upper rack 15 and therefore the additional accumulator loads do not hinder the digitation of the reversible accumulator 7 by the upper rack. In addition, no transfer spring load is applied to the main rack in the home position and no extra motion of the main racks is needed for transfer. Also, additional secondary accumulators may be provided by merely extending the length of the transfer rack 273 and providing additional accumulator racks and shafts.

During the digitizing stroke of the rack 276, should a tens transfer become necessary, a double width tooth 269 is provided on the accumulator gears 10 and 10', as illustrated in FIGURE 4. A pivot arm 281 is rockably mounted upon shaft 282 in proximity to each of the accumulator gears and contains a camming tooth 283 which is positioned in the same plane as the double width tooth 269 of the accumulator gear and is biased by spring 284 in contact with the accumulator gear so that when the double width tooth strikes the camming tooth 283 on pivot arm 281, the pivot arm will rock counterclockwise about the shaft 282. The pivot arm 281 normally latches the bail 261 of the next higher order which is pivotally mounted upon shaft 285. When the transfer latch bail 261 is released by pivot arm 281, it will pivot in a counterclockwise direction about the shaft 285 in response to the bias provided by spring 286, which extends between the bail 261 and a framing pin 287. The bail 261 will rotate in a counterclockwise direction to a position determined by the stop 268 which will be effective to produce a tens transfer in the accumulator of the next higher order.

As seen in FIGURE 3, as the transfer rack 276 nears its home position, a lever 288 loosely pinned to the lower rack 273 at 289 will strike a projection 290 on the bail 261 thereby rocking the lever 288 in a clockwise direction, which will therefore release the transfer rack 276 which it previously held latched in position against the bias of spring 291 which is connected between a pin 292 on lower rack 273 and a pin 294 on transfer rack 276. The clockwise rotation of lever 288 against the bias of spring 295 lifts the latching projection 296 on lever 288 from the path of the shoulder 297 from transfer rack 276 allowing the transfer rack 276 to move under the action of spring 291 one increment to the left determined by pin 298 mounted on the transfer rack 276 sliding within the slot 299 in the lower rack 273. Movement of the transfer rack 276 one increment to the left advances the accumulator gear in engagement with the transfer rack by one tooth.

Figure 22:
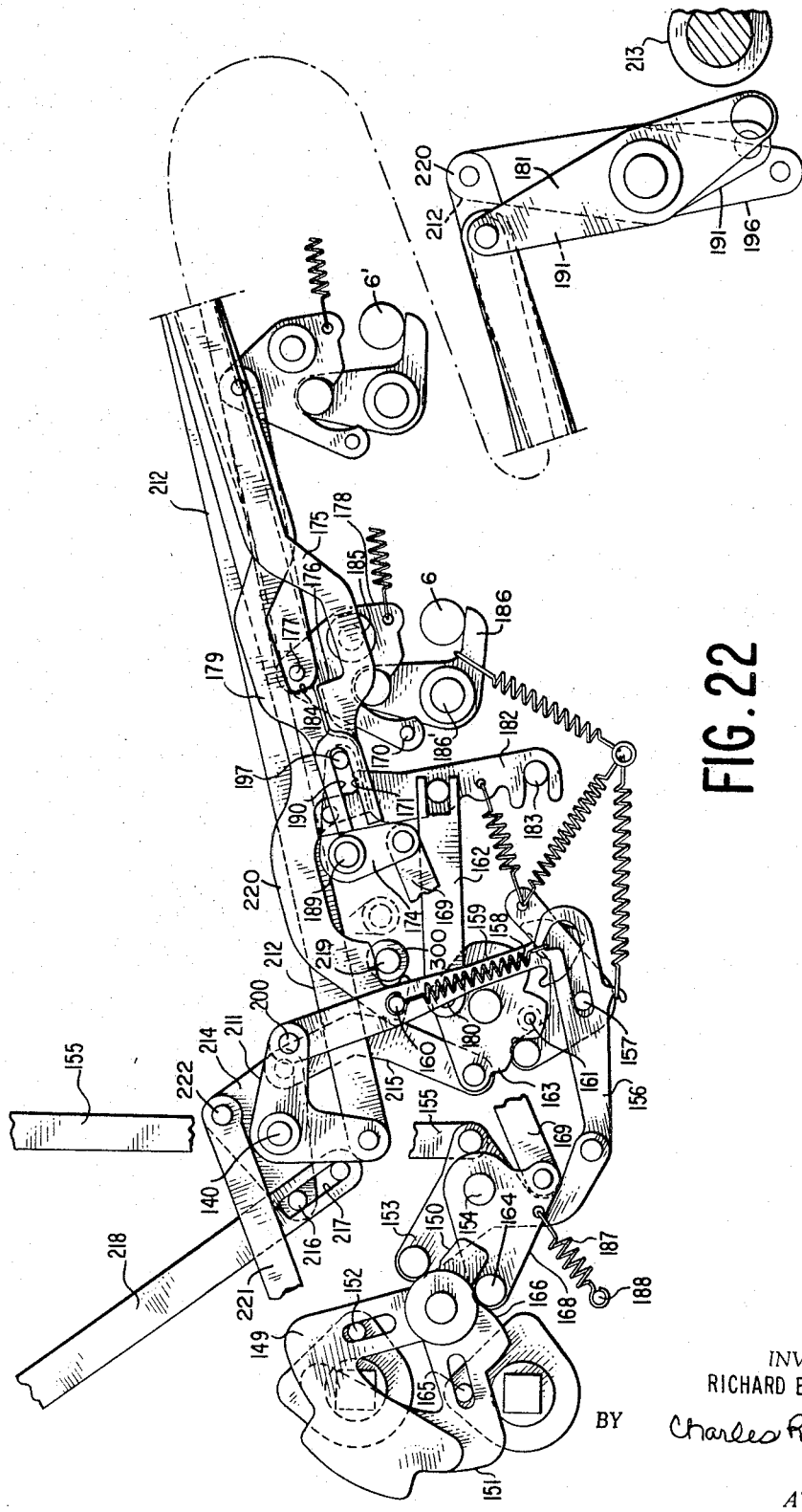
FIGURE 22 is a side view of the lower or department accumulator positioning and actuating mechanism.

Relatching of the transfer mechanism occurs during the first part of the following cycle during the time used to mesh the working accumulator at gears 10. It is effected by movement of a rack support shaft 300 connected at its neck 219 to the working accumulator positioning mechanism (FIGURE 22) at hook lever 220. Movement of the rack support shaft 300 to the right as seen in FIGURE 3 will drive a bar 301 mounted on the rack 276 to the right so that the lever 288 under the influence of its spring 295 will snap down over the shoulder 297 relatching the rack 276. At the same time, the shaft 285 will rotate clockwise as the lever 288 contacts the projection 290 of the bail 261 so that the bail will be rotated in a clockwise direction downwardly to be relatched by the pivot arm 281.

During a subtotal or a total operation, the shaft 282, which carries pivot arm 281, will rotate clockwise bringing the edge of its slot next to the key of the pivot arm 281 thereby preventing said arm from rotating, therefore acting as a zero stop during these aforementioned operations. It is pointed out at this time that clockwise rotation of the lower accumulators produces a total operation whereas counterclockwise rotation of the accumulators produces an add operation. The lower accumulators will produce a total, a non-total or an add operation, but will not produce a subtraction operation.

Figure 5:
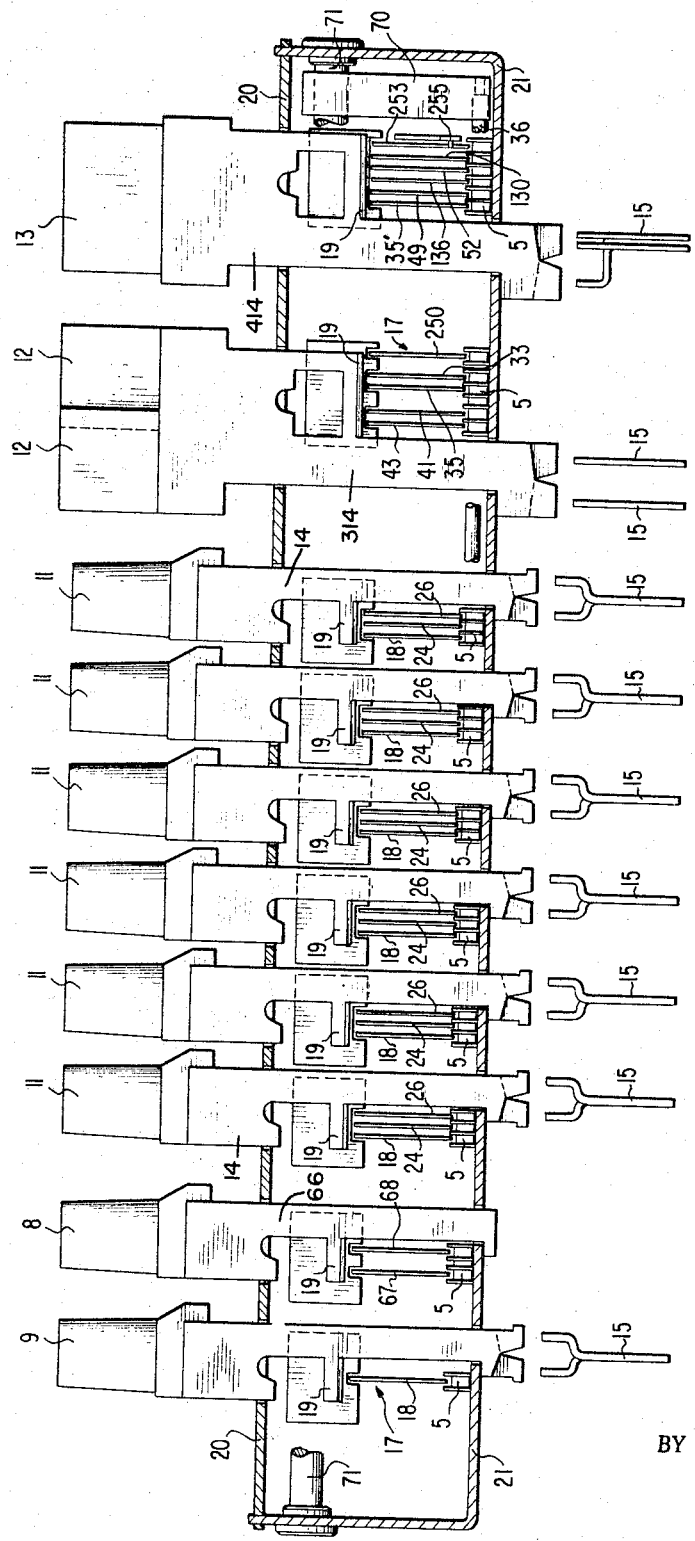
FIGURE 5 is a transverse cross section of the keyboard of the machine illustrating the various positions of the control slides.

In accordance with the present invention, as seen in FIGURE 5, an assortment of control slides are positioned in notches 17 of respective key stems 14, 66, 314, and 414 of each column of keys on the keyboard. These control slides control certain routines of keyboard entry, there being a different assortment of slides for different columns of keys dependent upon the functional operation of that particular column.

FIGURE 5 discloses a front sectional view of the keyboard illustrating the relationship between each group of control slides and the respective column of keys. Each group of slides is mounted on respective support members 5 which provide individual sliding channels for each of the control slides insuring separation of the slides and free movement thereof in the longitudinal direction. Each of the key stems 14 in each column of keys is provided with a projection in the form of an actuating shoulder 19 which is positioned transversely to the key stems immediately above the control slides associated with the particular key stem. As will become clearer as this description proceeds, the pressing of a key will force the actuating shoulder in a downward direction against each of the control slides positioned in the respective notches 17 of the keys thereby providing selective actuation of the keys in a direction and to an extent determined by various camming surfaces provided on the control slides.

Figure 6:
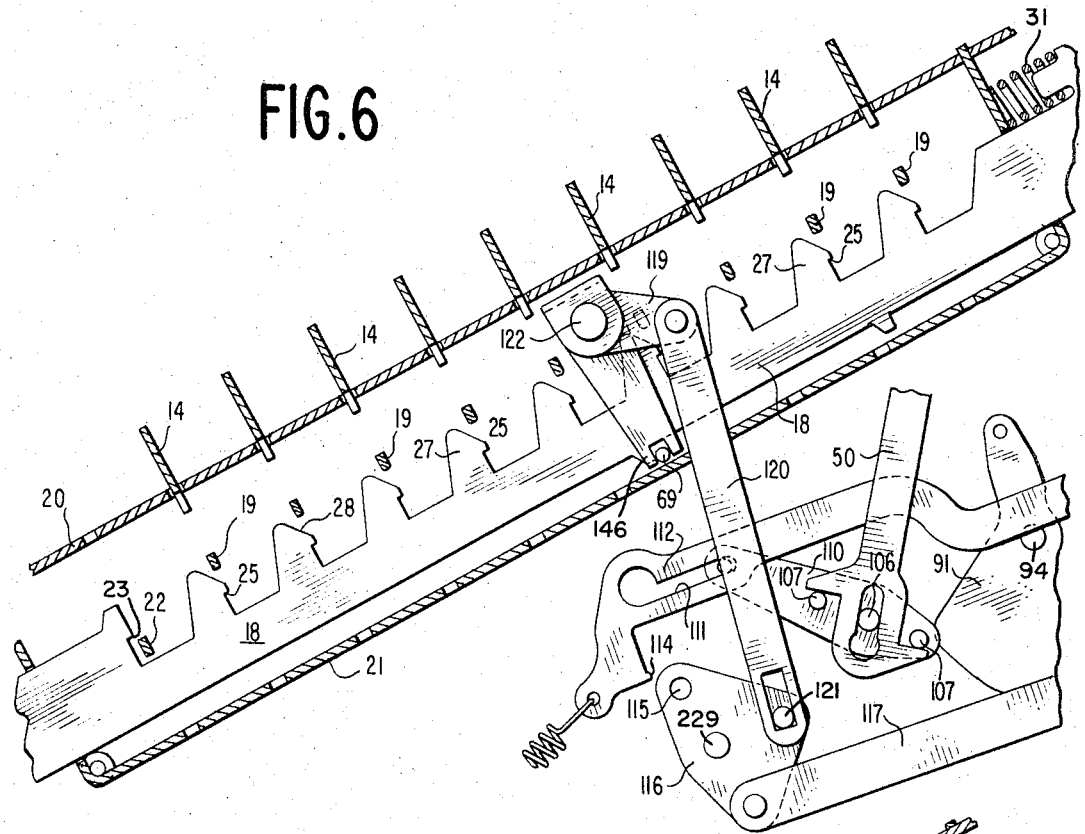
FIGURE 6 is a side section of the keyboard illustrating a key latch and zero stop control slide.

Beneath each column of amount keys 11 there is provided three slides, of which the first is a key latch and zero stop control slide 18 illustrated in detail in FIGURE 6. The control slide 18, which is included also in the column of identification keys 9, latches the shoulder 19 of a depressed amount key stem or identification key stem 14 under a lip 25 provided on each projection 27 of the slide 18. The projections 27 provided for each key of a column in the amount section and identification section each include a camming surface 28 which effects a shifting of the slide 18 in response to depression of one of the amount keys 11 or identification keys 9. The control slide 18 not only provides for latching of the amount keys and identification keys but also effects control of the zero stop 22. The sliding movement of the control slide 18 during the latching of the stem 14 will allow the zero stop stem 22 to escape from beneath a shoulder 23 on the slide, thereby rendering the zero stop for that particular column of keys ineffective to restrain the particular accumulator rack 15 associated with that column.

A zero bail 69, provided adjacent a projection 146 on the lower portion of slide 18, is actuated by the accumulator positioning mechanism during total, subtotal, read and reset operations to clear the zero stop stem 22 by shifting each of the slides 18 in the amount columns. The zero bail 69 is also controlled by the clear key to release amount keys and identification keys incorrectly depressed.

The second control slide in the group associated with each column of amount keys is a full stroke slide 24 illustrated in FIGURE 7. The full stroke slide 24, at the beginning of a machine cycle, shifts to the left to hold the shoulder 19 of a depressed key stem under a respective hook 227 formed on individual projections 228 of the slide 24. Movement of the slide 24 is controlled by a bail 36 riding between a pair of projections 62 on the lower portion of the slide 24, and movement of the bail 36 is in turn provided by other control slides and also by mechanisms associated with the accumulator positioning device, so that slide 24 not only prevents depressed keys from raising and accidental depression of other keys during the machine cycle, but also, should a key be only partially depressed, the hook 227 for blocking extending longitudinally like slide 24 will strike the key stem, as illustrated by the partially depressed key in FIGURE 7, preventing movement of the slide 24 and of the bail 36 until the key is depressed to its full extent. As will be described hereinafter, a blocking of movement of the bail 36 so connected to slide 24 prevents operation of the machine.

The third slide of each group associated with the amount keys is an amount interlock slide 26 illustrated in FIGURE 8. The slide 26 is actuated by bail 34 so that during a total, subtotal, read or reset operation, one of the points A, B or C on each of a plurality of projections 30 is positioned beneath the respective key stems thereby preventing depression of the amount keys during any of these operations. The bail 34 is controlled by the department accumulator positioning mechanism, as shown in FIGURE 9, so that engagement of the accumulator 10 or 10′ with the rack 276 or 276′ produces coordinated shifting of the slide 26, thereby preventing depression of the amount keys, and additionally, if amount keys have been depressed, slide 26 and its slots 32 will be locked and bail 34 will prevent depression of certain department and function keys.

Beneath each column of department keys 12 is located a group of five slides which are positioned in openings or notches 17 in the key stems 314 in a similar manner as the control slides associated with the amount columns. The first slide of the department key group is a department interlock slide 33 which is illustrated in FIGURE 9. The department interlock slide 33 is actuated by the bail 34 positioned between projections 60 in the bottom side of the slide. The bail 34 is controlled by the accumulator controls so that during a desired operation of the machine, the department keys 12 may or may not be depressed due to projections 37 blocking the actuating shoulder 19 of the key stem, depending on the particular operation to be performed.

Figure 10:
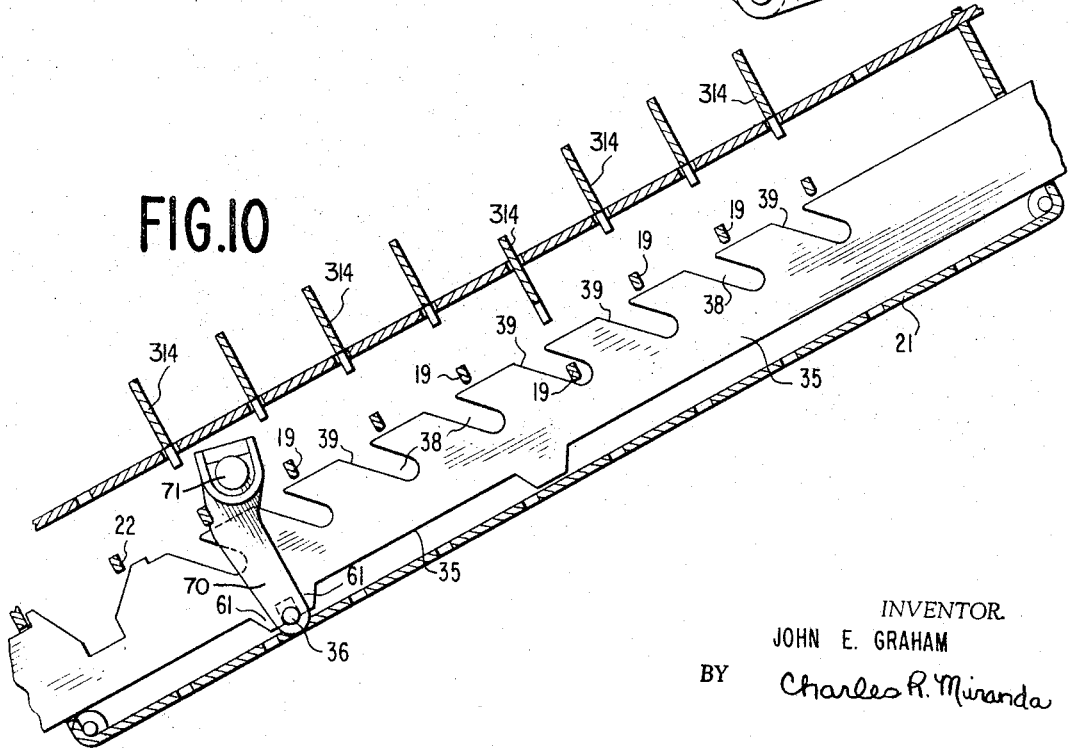
FIGURE 10 is a side section of the keyboard illustrating a clutch trip and key hold-down slide.

The second slide of the group is a clutch trip and key hold-down slide 35 illustrated in detail in FIGURE 10. The slide 35 is provided with a plurality of diagonal slots 38, each positioned below a respective key stem 14. As a department key 12 is depressed, the slide 35 will be cammed by the camming surface 39 of the slot 38 to the left as shown in the figure, thereby effecting movement of bail 36 which is mounted between a pair of projections 61 on the lower portion of the slide. As indicated above, the bail 36 also actuates the full-stroke slide 24 in the amount key section, and, as will be set forth hereinafter in connection with FIGURE 18, also provides for actuation of the clutch assembly thereby initiating a machine cycle. While the sloping configuration of the slots 38 will hold the key 12 in a depressed position, the plateau 39 between the respective slots will prevent depression of a second key in that column.

The third slide in the department key group is a department column interlock slide 41 illustrated in detail in FIGURE 11. The slide 41 contains a plurality of projections 44, each associated with a respective key stem 314. The projections 44 having camming surfaces 42 which, when cammed by the shoulder 19 of the key stem being depressed, effect movement of the slide to a different position for each department key, thereby preventing depression of a second key in that department column. The selective movement of the slide for each key in the column results from the varying width of the projections 44 and the resulting variable spacing of the slots 45 between each of the projections.

The fourth slide in each department column is a department column itemizer control slide 43 illustrated in detail in FIGURE 12. The control slide 43 has two forms of camming surfaces 47 and 48 which effect selective movement of the control slide in one direction or another upon actuation of a particular department key 12. The camming surfaces 47 move the slide to the right, as seen in the figure, while the surfaces 48 cause slide movement to the left. These movements control, through a bail 46 and a linkage 51 (FIGURES 18 and 19), the mechanism which determines whether the working accumulator 7 is to receive an amount additively, subtractively or is not to be digitized at all. For example, a paid-out key or a credit key associated with the surfaces 48 will cam the control slide 43 to the left as seen in the figure, thereby effecting a subtractive entry into the accumulator whereas, a meat department key associated with one of the surfaces 47 would cam the slide to the right, as seen in the figure, to effect an additive entry into the accumulator. The particular manner in which the bail 46 actuates the linkage 51 will be described in greater detail hereinafter.

The fifth slide in the department column group is a "no sale" interlock control slide 250, which comprises part of the instant invention, illustrated in FIGURE 17. The slide 250 is detented in either of two positions by a spring pressed detent 252. The slide carries a plurality of camming surfaces 251, each surface being in substantial registration with a respective department key such that depression of any of the department keys will be effective to cam the slide 250 into its forward position, as shown in FIGURE 18. Movement of the slide 250 to its alternate positions will through detent 252 also control the position of a "balance due" control slide in the function section in a manner to be described.

Positioned in a notch 17 in the key stems 414 in each function column is a group of five control slides. The first of these control slides is the clutch trip and key hold-down slide 35', illustrated in FIGURE 10 and described above in connection with the department key section. This slide in the function column operates in an identical manner as the comparable slide in the department key section.

Figure 13:
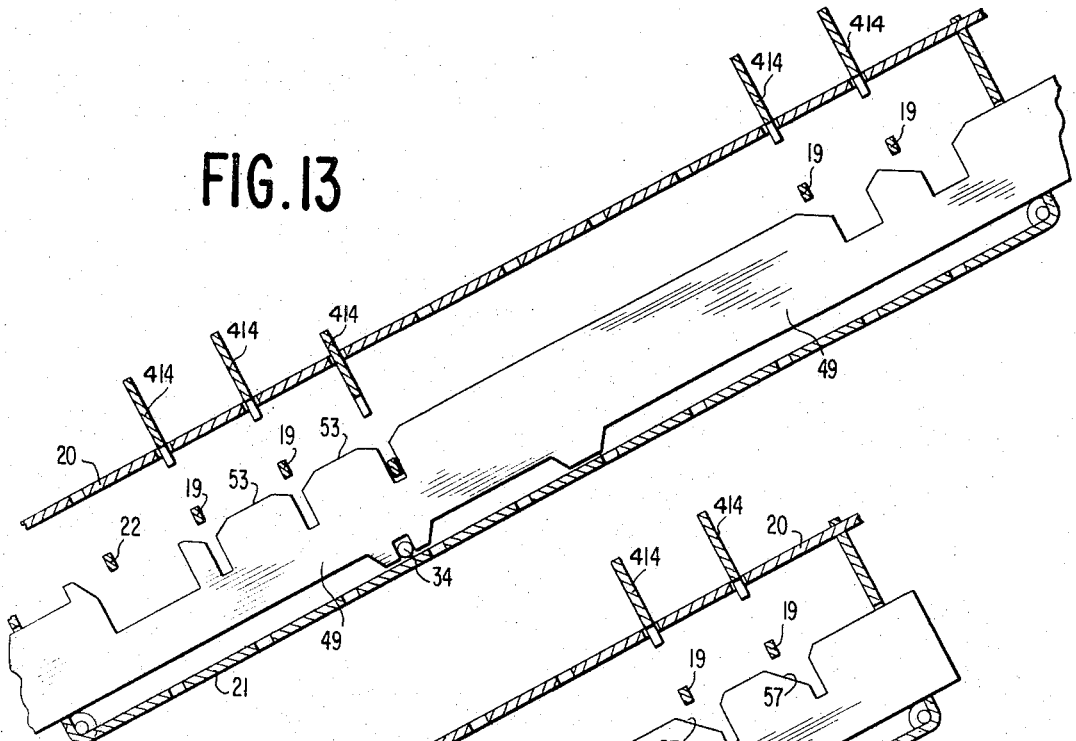
FIGURE 13 is a side section of the keyboard illustrating a function interlock slide.

A second slide in the function column group is a function interlock slide 49 which is illustrated in detail in FIGURE 13. The slide 49 is movable by means of the aforementioned bail 34 associated with the control slide 26 in the control slide 26 in the amount column and slide 33 in the department column so that during a keyboard entry, certain function keys 13 may or may not be depressed depending upon previous entries in other sections of the keyboard, which will control the bail 34 through their respective slides. In a similar manner as slide 33, the slide 49 provides abutment surfaces 53 which will prevent depression of certain function keys after the slide 49 is moved by the bail 34. This will be effected during the machine cycle in a manner to be described hereinafter in connection with the accumulator control mechanism.

Figure 14:
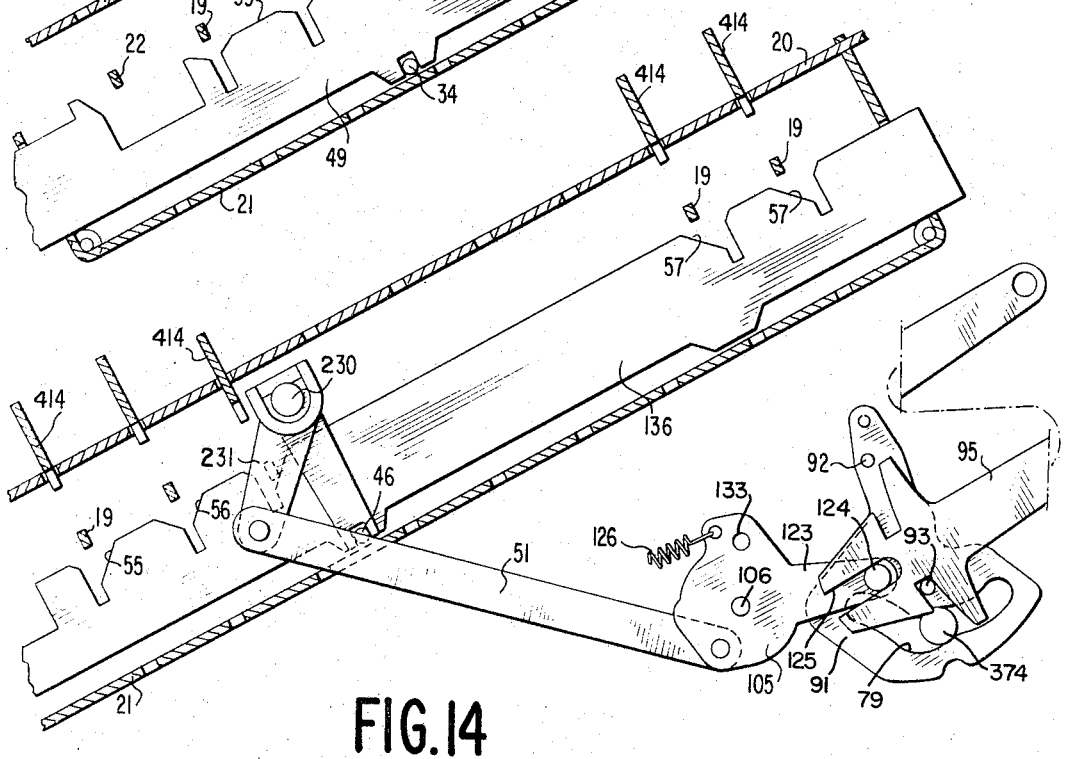
FIGURE 14 is a side section of the keyboard illustrating a function itemizer control slide.

The third slide in the function column is an itemizer control slide 136 illustrated in FIGURE 14. The control slide 136 selects the particular mode of operation, such as adding, subtracting or non-add to be performed in the working accumulator from the depression of a function key. The depression of a function key will, through the striking of a respective cam surface 55, 56 or 57 move the slide as shown in the figure to the right, to a neutral position column or to the left, respectively, whereby through the bail 46 and link 51, the accumulator will be shifted to the proper position for the particular function desired, as will be described in greater detail in conjunction with FIGURE 21.

The fourth slide in the function column is function interlock slide 52 illustrated in FIGURE 15. The interlock slide 52 is very similar in construction and purpose to the slide 41 described in connection with the department column interlock in that it contains a plurality of projections 54 having camming surfaces 152 which will move the slide to a different position for each function key 13 thereby preventing the depression of another function key. Again the variable width of the projections 54 and consequent variable spacing of the slots 58 in the slide 52 different than the key spacing are responsible for the differential movement of the slide in response to depression of a selective key.

The fifth slide in the function column is a "balance due" control slide 253 illustrated in FIGURE 17. The slide 253 carries a camming surface 254 which effects a shifting of the slide to the right as seen in FIGURE 17 upon depression of the "balance due" key 13" in substantial registration therewith. The slide 253 also carries an auxiliary slide 255 which is slidably mounted thereon by means of pins 256 in slide 253 riding in slots 257 in slide 255. A tension spring 258 mounted between one of the pins 256 and the slide 255 biases the auxiliary slide to a rearward position relative to the slide 253 such that blocking shoulder 259 on the auxiliary slide 255 is normally free of the shoulder 19 on the "balance due" key 13" when the slides are forward.

Also provided in the function column is a change computer slide 130, illustrated in FIG. 19. The slide 130 provides a plurality of camming surfaces 147, 148 and 149 which effect an add, non-add and subtract function, respectively, via the bail 46. The slide 130 also is provided with a sliding lever 138 slidably mounted on pins 137 fixed to the slide 130. The secondary slide 138 is operatively associated with bail 139 connected to a symmetry rack (not shown) beneath the function column.

As indicated previously the slides 35, 43 and also 35', 136 in the department and function columns control and actuate the accumulator positioning mechanisms and the clutch trip mechanism through the various bails 46 and 36.

Figure 20:
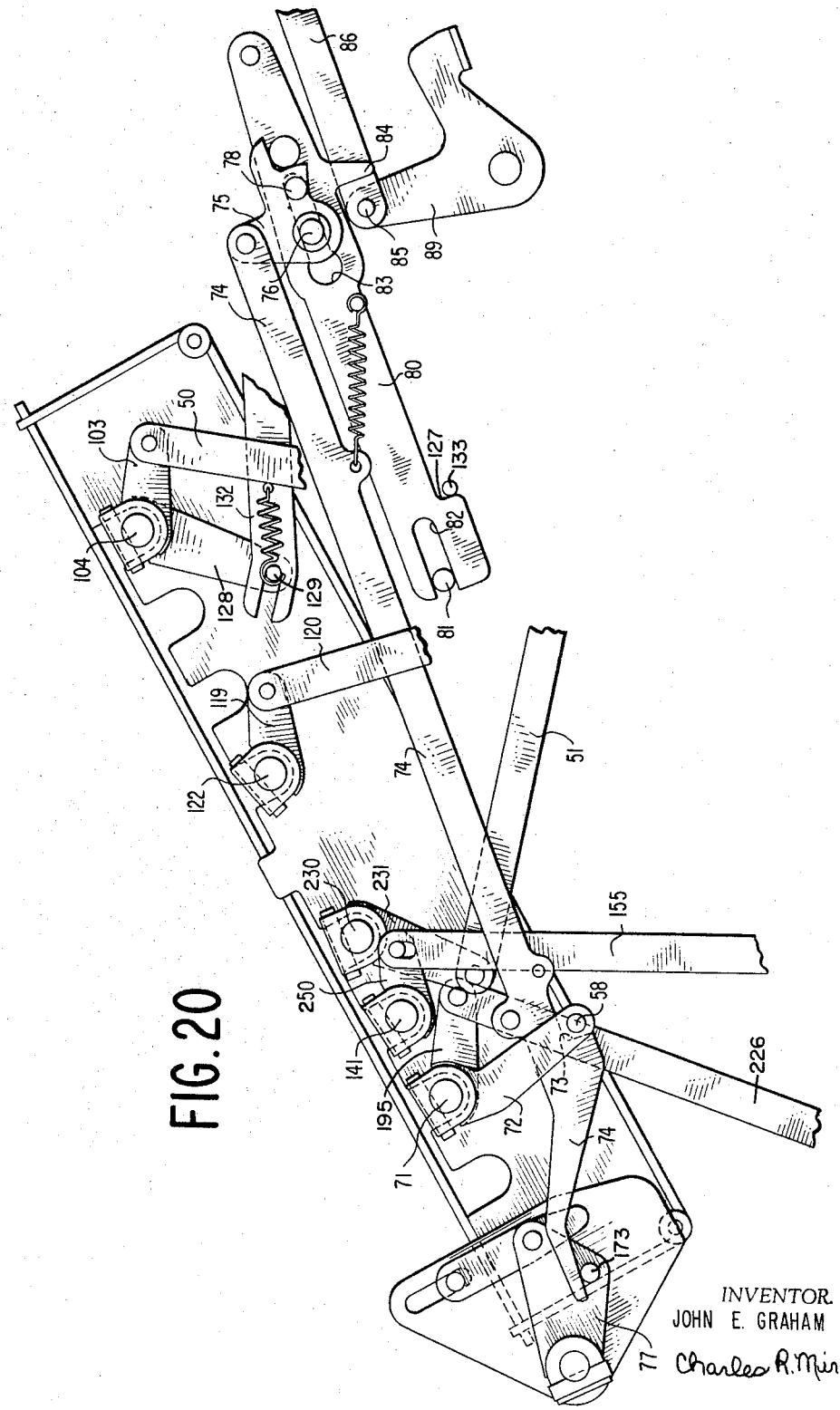
FIGURE 20 is a side section of the keyboard illustrating the clutch trip mechanism and the various control linkages actuated by the keyboard control slides.

The aforementioned bail 36, which is actuated by the clutch trip slide 35, has loosely mounted at one end thereof an arm 70 (FIGURE 5), securely mounted to a shaft 71 which is rotatably mounted in the machine side frames, also seen in FIGURE 20. The shaft 71 carries rigidly mounted at its extreme end an arm 72 having a pin 58 which lies adjacent shoulder 73 of clutch trip arm 74. As the slide 35 or 35' is moved by a respective department or function key, it carries the bail 36 to the left as seen in FIGURE 10, and through the arm 70 effects rotation of the shaft 71 in a clockwise direction so that the pin 58 will engage the shoulder 73 of the clutch trip arm, driving the arm to the left to effect initiation of a machine cycle.

Looking now more particularly to the upper accumulator positioning and engaging mechanism, the accumulator is raised and lowered to mesh the accumulator gears 373 with either the upper rack gear section 375 or the lower rack gear section 376 of the drive racks 15 depending upon the type of operation to be performed. For this purpose, a mechanism is provided which is under the control of the different control slides for determining and effecting the positioning of the accumulator.

However, upon depression of the "balance due" key 13", the slide 253 will be cammed rearwardly thereby to cause the shoulder 259 of slide 255 to be pressed against the side of the key by the bias of spring 258. The detent 252, which also controls slide 250, will be effective to hold both slides 250 and 253 in the rearward position until the key 13" is released, whereupon the projection 259 will be moved into blocking relation with the key 13" to prevent a second depression thereof until one of the department keys has been depressed to return both slides 250 and 253 to their normal forward positions through camming surface 251 and detent 252, respectively.

A blocking ledge 260 is provided on slide 253 in substantial registration with "no sale" key 13'. This blocking ledge 260 serves to prevent depression of the key 13' when the slides 250 and 253 are normally in the forward positions. Accordingly, the "no sale" key cannot be depressed except after a totalling operation effected by depression of the "balance due" key 13".

In addition to the above-mentioned groups of control slides, there is provided in the column containing the amount release key 8 a zero stop control and clear key slide 67, which moves to the left in response to pressure of the clear key stem 66 on the camming surface 59, which through bail 69 releases depressed amount keys. The clear key locking slide 68, shown in dash lines in FIGURE 16, is controlled by the bail 36 such that movement of the bail to the left will effect movement of the slide 63 to the left bringing a shoulder 65 under the clear key stem 66 thereby preventing depression of the clear key during a machine operation.

Figure 21:
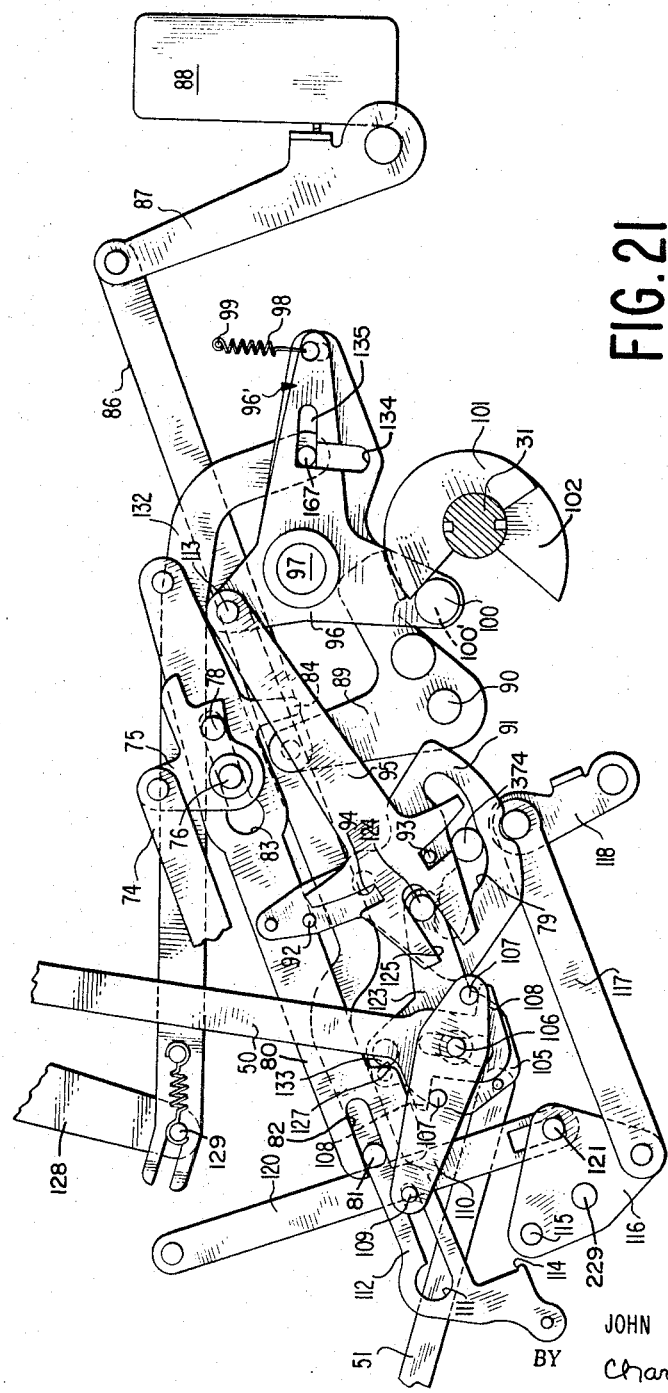
FIGURE 21 is a side view of the upper or main accumulator positioning and actuating mechanism.

Looking specifically to FIGURES 20 and 21, the clutch trip arm 74 is connected at one end to a bell crank member 75, securely mounted upon a shaft 76 which, in turn, extends through slot 83 in power trip pivot pin 80. The other end of the clutch trip arm 74 is supported upon a pin 173, mounted upon rotatable plate 77. The bell crank member 75 provides a pin 78 which also rides in slot 83 of power trip slide 80. The power trip slide 80 is supported at one end by a pin 81 positioned within slot 82 in the slide 80 the pin being securely mounted on link 112 (FIGURE 21). The slide 80 is also supported by pivot pin 76 of bell crank member 75 which is surrounded by slot 83 such that rotation of bell crank member 75 by clutch trip arm 74 will serve to rotate the slide 80 about the pivot pin 76 of 75 thereby rocking the link 112 downwardly preparatory to releasing the zero stop mechanism 118, as will be described. The power trip slide 80 provides a projection 84 in registration with a pin 85 associated with the power trip lever 86, which, as seen in FIGURE 21, actuates a bell crank member 87 in a counterclockwise direction to trip the power switch 88 effecting application of power to the machine. The pin 85 is also associated with a clutch dog 89, which when rotated about its support shaft 90 effects engagement of the clutch (not shown).

A box cam 91 (FIGURE 21) carries a pair of pins 92 and 93 arranged on opposite sides of the frame pin 94 upon which the box cam 91 pivots. These pins are adapted to be selectively engaged by a hook member 95 connected at pin 113 to a three arm cam follower 96 pivoted on the shaft 97 side by side with a two arm bell crank follower 96'. The cam follower is urged counterclockwise by a spring 98 tensioned between one arm of the cam follower and a frame pin 99 to press a roller 100 and 100' on another arm of 96 and 96' respectively against cams 101 and 102 keyed on the main drive shaft 31 rotatable counterclockwise. Cam 101 is a total cam which has a high portion extending over substantially half of its periphery whereby to rock the cam follower 96 and its bent slot 134 when link 132 is normally spring biased placing its pin 167 to the left in slot 134, and thereby position the hook member 95 rearward during add, subtract, and total operations and approximately the first half of a machine cycle. Cam 102 is a subtotal cam with a high portion effective further in the cycle so that when link 132 is shifted right by linkage 50 its pin 167 in straight slot 135 of follower 97' is shifted to the right into the matching part of the other slot 134. Both followers are then locked by pin 167 to act in unison to hold hook 95 to the right during the major part of the cycle during sub-total operation.

For the purpose of locating the hook member 95 in a lower, intermediate or upper position, a disc 105 is rotatably mounted on shaft 106 and is controlled by a link 51 connected through shaft 230 and bell crank 231 to bail 46 on itemizer control slides 43 and 136. The disc 105 carries a projection 123 which carries a stud 124 located in slot 125 of the hook member 95. Rotation of the disc 105 in either the counterclockwise or the clockwise direction causes rotation of the stud 124 and proportionate movement of the hook member 95 about the pivot pin 113 carried by the cam follower 96. The hook member 95 is therefore positioned by disc 105 with regard to the pins 92 and 93 carried by the box cam 91 so as to engage either with the pin 92 or the pin 93, or to engage both pins and thereby provide a non-add situation. With the hook member 95 engaging one of the pins 92 or 93, a rocking of the cam follower 96 will effect rotation of the box cam 91 in either a clockwise or a counterclockwise direction providing through cam groove 79 either additive or a subtractive situation for primary itemizing accumulator shaft 374 respectively.

The disc 105 also carries a pin 133 which is urged by a spring 126 (FIGURE 15) in a counterclockwise direction against a shoulder 127 of the power trip slide 80. Relation of the disc 105 is effected by longitudinal movement of the power trip slide 80 during rotation of the clutch dog 89 by the projection 84 and actuation of the clutch and power trip lever 86 provided the link 51, which controls the positioning of the hook member 95, does not retain the disc 105 in another position.

The shaft 104 (FIGURE 20) which is controlled by the total and subtotal keys in the function column is also connected to a bell crank 128 which through stud 129 and link 132 is connected to the three arm cam follower 96 and the follower 96' (FIGURE 21) at pin 167 and serves to lock up the cam followers during a subtotal operation so as to effect engagement of the accumulators for both cycles of the accumulator racks.

When a total or subtotal is desired, depression of the subtotal key or total key in the function section will cause actuation of the control link 50 through the bell crank 103 shown in FIGURE 20. The bell crank 103 will pivot about a shaft 104 in a respective direction, clockwise for subtotal and counterclockwise for total which will in either case cause the link 50 to rock an arm 110 counterclockwise about shaft 106 by means of one or the other of a pair of studs 107 carried by the arm 110 contacting one of two lateral projections 108 on the control link 50. A pin 109 mounted on lever arm 110 rides in slot 111 in link 112. As the lever arm 110 rotates, it effects a downward pivoting of the link 112 about a stud 113 located on one arm of the three arm cam follower 96. A shoulder 114 of the link 112 will, after the link is moved to the lower position, be in the plane of a stud 115 mounted on a rockable disc 116 and as the cam follower 96 is rocked by the cam 101, the shoulder 114 will, through the stud 115, rock the disc 116 clockwise about its pivot pin 229, which through a link 117 will pull the accumulator zero stop mechanism 118, freeing the box cam 91 for rotation. Rocking of the disc 116 also effects counterclockwise rotation of a bell crank 119 (FIGURE 6) by means of a lever arm 120 connected to the disc 116 at stud 121, and through the bell crank 119 and a shaft 122 effect movement of the bail 34 and consequent shifting of the interlock slides 26, 33 and 49 in the amount department and function sections, respectively, thereby preventing depression of the keys in these sections during the machine cycle.

The mechanism for positioning the lower accumulators is illustrated in FIGURES 20 through 24. Cams 149 and 151 (FIGURE 22) operate through selector locks (not shown) to condition the machine for a read or reset operation. The cam 149, representing a read operation, is rotated in a counterclockwise direction by means of a pin 152 connected to the lock assembly. A cam surface 150 on the cam 149 will rotate a cam follower 153 clockwise about its pivot shaft 154. The follower 153 has pinned thereto a link 155 connected to a bell crank 270 (FIGURE 20) which rotates a shaft 141 causing shifting of the bail 34 associated with control slides 26, 33 and 49. The bail 34 in turn will move the interlock slides 26, 33 and 49 into a position where none of the keys in the amount section can be depressed, while in the department section, depression of department keys is permitted if neither the subtotal nor total keys in the function section have previously been depressed. In the function section, the slide will be moved so that only the subtotal or total key can be depressed, and this will be possible only if none of the keys in the department section have previously been depressed.

The follower 153 has connected thereto a second link 156 which, when the follower is rotated, rides to the left over a guide pin 157. A spring 158 is connected between the link 156 and a pin 160 on sword fish 159. When the link 156 is moved to the left through rotation of the cam follower 153, the spring 158 will rock the sword fish 159 to the left until it is in alignment beneath pin 161 mounted on a rotatable disc 163, as seen in FIGURE 23.

It should be noted that the machine requires two cycles to reset or read a department total. The first cycle is for positioning the desired accumulator beneath the racks and the second cycle is for the actual read and printing of the total and sub-total or reset operation.

The extreme end of the sword fish 159, opposite the pin 161, is connected at 200 to a pivot arm 211 rotatable about stationary shaft 140. The pivot arm 211 is rocked through link 212 by the main cam line 213 via a cam follower 196 which also moves hook lever 220 acting on shaft 300 at its neck 219.

The cam 149 having been set, counterclockwise rocking of the pivot arm 211 by the main cam line 213 actuates the sword fish 159 during read operation so as to effect clockwise rotation of the rotatable disc 163 through contact with the pin 161. A link 162, pinned to the disc 163 at 180, will thus rock a latch arm 182 about pivot pin 183 into the path of a latch pin 170 mounted on an accumulator engaging cam 178.

Figure 25:
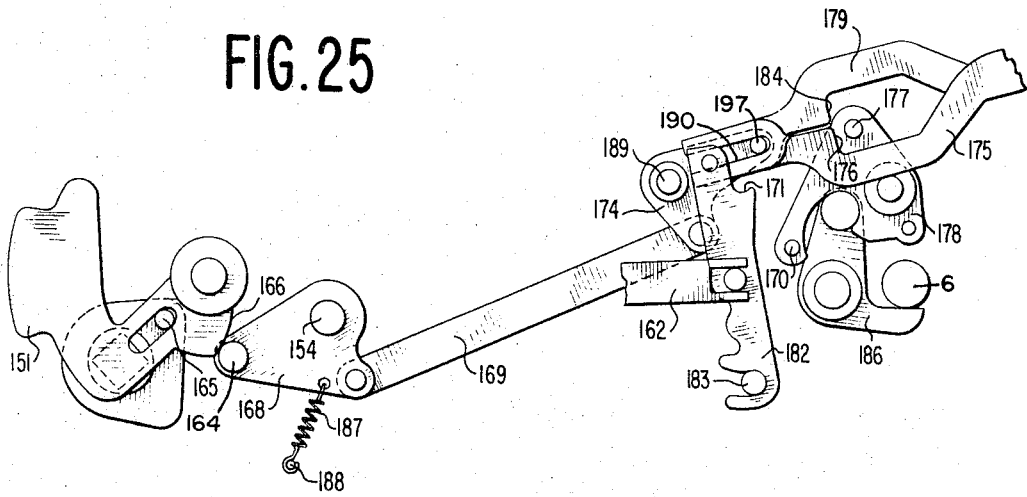
FIGURE 25 illustrates still another actuated position of the mechanism of FIGURE 22.

A selector link 179, connected at one end to the cam follower 191 like 181, has a latching surface 184 which lies in the same plane as a pin 177 which is also mounted on the accumulator engaging cam 178, and is rotatable with cam 178 about pivot shaft 185. When main cam 213 rocks the cam follower 191, the surface 184 will strike the pin 177 rocking the cam 178 clockwise thereby rotating bell crank 186 about pivot axis 186' in a counterclockwise direction to lift shaft 6 and mesh the accumulator 10 with the racks and at the same time latch the pin 170 on a surface 171 (FIGURES 24 and 25) of the latch arm 182 which will hold the accumulator in mesh during the last half of the first cycle and the first half of the second cycle.

The latch arm 182 will, in the first half of the second cycle, be released by the machine mechanism so that later in the cycle when the selector link 179 is rocked back to its home position, the engaging cam 178 will be allowed to rotate back to its rest position, demeshing the accumulator from the racks.

The cam 151, which conditions the machine for a reset operation via a selector lock (not shown) is rotated in a counterclockwise direction through a pin 165 mounted on the other member of the selector lock actuating mechanism. A cam surface 166 of the cam 151 will rotate the cam follower 153 to perform the same functions described above in connection with the cam 149 with the exception that a selector link 175 connected to a cam follower 181 which engages a separate cam on the main cam line 213 will be moved into the plane of the pin 177 so that the accumulator 10 will be demeshed from the racks a half cycle earlier for the reset operation than for the read operation.

The means for changing the positions of the selector links comprises a cam follower 168 which is urged against the camming surface 166 of cam 151 by a spring 187 connected to frame pin 188. A link 169, connected between the follower 168 the roller 164 of which and a pivot arm 174 (FIGURES 22 and 25), will pivot the arm 174 about pivot shaft 189 in a counterclockwise direction so that the pin 197, which passes through slots 190 in the end of the links 175 and 179 will lift the links upward, placing the latching surface 176 of the link 175 in the same plane as the pin 177. When the cam follower 191 is rocked by the main cam 213 the link 175 will be actuated so that the latching surface 176 will strike the pin 177 rotating accumulator engaging the cam 178 in a clockwise direction and the bell crank 186 in a counterclockwise direction thereby engaging the accumulator with the rack; however, the accumulator will be demeshed from the racks a half cycle earlier because the link 175 is controlled by a different cam on the line 213.

Figure 26:
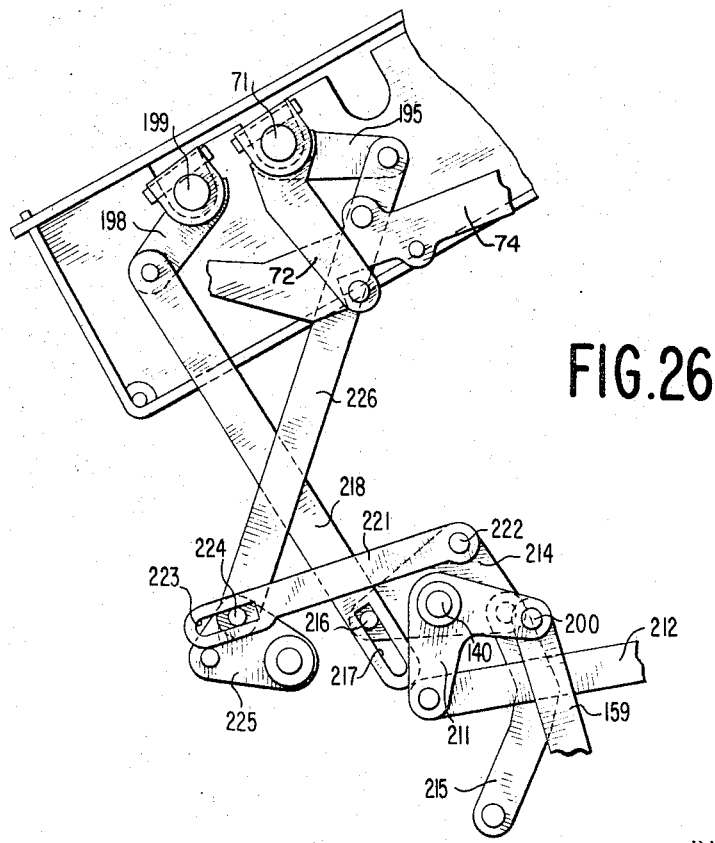
FIGURE 26 illustrates the linkage which controls operation of the zero bail during read and reset operation of the department accumulators.

A second pivot arm 214 is also mounted on the bell crank shaft 140 and is connected at one end to the rockable disc 163 through a link 215. The other end of the pivot arm 214 carries a stud 216 which rides in a slot 217 of a link 218. The link 218 is connected at its opposite end via bell crank 198 (FIGURE 26) and rotatable shaft 199 to the zero bail 69 of FIGURES 6 and 24 by suitable mechanism (not shown). The control of the zero bail during a read and reset operation comes about because the department accumulators are engaged later in the cycle while the racks will tend to move early in the cycle with the itemizing accumulator 7 in mesh. In a normal cycle the zero stops 22 are released through a link 129 (FIGURE 20) but during a read or reset cycle, the link 218 will not allow them to release until the department accumulators are also meshed. A link 221 is loosely mounted to a stud 222 on arm 214 and its other end has a slot 223 which surrounds a stud 224. The stud 224 is mounted on a pivotal block 225 and at stud 224 block 225 also has connected thereto a link 226 which is connected through a bell crank 195 and pivotable shaft 71 to the bail 36 which controls the tripping of the clutch mechanism.

The selector locks are so positioned with relation to the block 225 that if the locks are not rotated to their full position they will interfere with the block 225, preventing depression of a department key and therefore preventing release of the clutch through the link 226. Also, if a department key is depressed, the block 225 will prevent rotation of the lock.

The link 221 upon rotation of a lock and depression of a department key will through the disc 163, link 215, arm 214, and stud 222 be rocked to hold the link 226 down until the second cycle has begun thereby preventing the clutch from disengaging at the end of the first cycle.

I claim:

1. A keyboard control mechanism for a calculating machine having a plurality of keys capable when depressed of initiating various machine operations comprising:

first control means shiftable by certain ones of said keys included in a first key set from a first to a second position, second control means oppositely shiftable by other ones of said keys included in a second key set from a second position corresponding to said first control means second position to a first position corresponding to said first control means first position, detent means associated with said first and second control means for effecting coordinated movement thereof between said corresponding positions upon depression of first one of said keys of said first set and next of a key of said second set, and shoulder means associated with said second control means for allowing a first while preventing a second depression of a first key of said other ones of said keys when said second control means is in its first position.

2. A keyboard control mechanism for a calculating machine according to claim 1 wherein:

said first and second control means consisting of slides carrying a camming surface each being capable when struck by a depressed key to shift its slide to said second and said first position, respectively, said shoulder means consisting of a slide and spring mounted to said slide and said second control means so as to dispose said shoulder means in a position blocking said first key when said second control means is in its first position, said shoulder means being capable of shifting with relation so said second control means so as to permit depression of said first key when said second control means is in its second position thereby permitting shifting of said second control means to the first position.

3. A keyboard control mechanism for a calculating machine according to claim 2 wherein:

said second control means including abutment means for preventing depression of a second key of said other ones of said keys when said second control means is in its second position thereby preventing depression of said second key until said first key of said other ones of said keys has been depressed.

4. A keyboard control mechanism for a calculating machine of the cash registering type having a plurality of secondary accumulators and having a plurality of department and function keys capable when depressed of respectively selecting said accumulators and initiating various machine operations comprising:

first control means associated with and shiftable by certain ones of said department keys from a first position to a second position, second control means associated with and shiftable by certain ones of said function keys from a second position corresponding to said first control means, second position to a first position corresponding to said first control means first position, detent means associated with said first and second control means for effecting coordinated movement thereof between said corresponding positions upon depression of said certain ones of said keys, and shoulder means associated with said second control means for preventing depression of a first key of said function keys when said second control means is in its first position, said first and second control means consisting of first and second slides carrying a camming surface each being capable when struck by a depressed key to shift its slide to said second and said first position, respectively, said shoulder means consisting of an auxiliary slide spring mounted to said second control means so as to be in a position blocking said first key against a second depression when said second control means is in its first position, said shoulder means being capable of shifting with relation to said second control means so as to permit depression of said first key when said second control means is in its second position thereby permitting shifting of said second control means to the first position, said second control means including abutment means for preventing depression of a second key of said function keys when said second control means is in its second position thereby preventing depression of said second key until one of said function keys has been depressed, said first key being a "change-balance due" key and said second key being a "no sale" key.

5. A keyboard control mechanism for a calculating machine having secondary accumulators and a first set and a second set of keys capable when depressed of respectively selecting said accumulators and initiating various machine operations comprising:

first control means shiftable by certain ones of said first set of keys from a first to a second position, second control means shiftable by other ones of said second set of keys from a second position corresponding to said first control means second position to a first position corresponding to said first control means first position, detent means associated with said first and second control means for effecting coordinated movement thereof between said corresponding positions upon depression of a key of any one of said sets of keys, and shoulder means associated with said second control means for preventing a second depression of a first key of said second set of keys when said second control means is in its first position, said shoulder means consisting of a slide and spring mounted to said second control means so as to dispose said slide in a position blocking said first key when said second control means is in its first position, said shoulder means being capable of shifting with relation to said second control means so as to permit a first depression of said first key when said second control means is in its second position and to allow said first key to remain depressed in said first position of said second control means, thereby permitting shifting of said second control means to its first position.

6. A keyboard control mechanism for a calculating machine of the cash registering type having secondary accumulators and having a first set and a second set of keys capable when depressed of respectively selecting said accumulators and initiating various machine operations comprising:

first control means shiftable by certain ones of said first set of keys from a first to a second position, second control means shiftable by other ones of said second set of keys from a second position corresponding to said first control means second position to a first position corresponding to said first control means first position, detent means associated with said first and second control means for effecting coordinated movement thereof between said corresponding positions upon depression of a key of any one of said sets of keys, and shoulder means associated with said second control means for preventing a second depression of a first key of said second set of keys when said second control means is in its first position, said shoulder means allowing first depression of said first key when said second control means is in its second position and allowing said first key to remain depressed in said first position of said second control means, said second control means including abutment means for preventing depression of a second key of said second set of keys when said second control means is in its second position thereby preventing depression of said second key until one of said second set of keys has been depressed.

7. A keyboard control mechanism for a calculating machine of the cash registering type having a plurality of keys capable when depressed of initiating various machine operations comprising:

a first control slide associated with a first set of said keys and having a plurality of camming surfaces capable of effecting shifting of said first control slide from a first to a second position upon depression of one of said first set of keys, a second control slide associated with a second set of said keys and having a plurality of camming surfaces capable of effecting shifting of said second control slide from a second position corresponding to said first control slide second position to a first position corresponding to said first control slide first position upon depression of one of said second set of keys, detent means associated with said first and second control slides for effecting coordinated movement thereof between said corresponding positions upon depression of a key of any one of said first and second sets of keys, an auxiliary slide mounted on said second control slide for shifting movement between normal and biased positions ond carrying a blocking shoulder which is in substantial blocking alignment with a change-balance due key of said second set of keys when said second control slide is in the first position and said auxiliary slide is in its normal position, said change-balance due key being capable upon depression thereof when said second control slide is in its second position of shifting simultaneously said second control slide to its first position and said auxiliary control slide to its biased position out of blocking alignment with said change-balance due key, spring means for shifting said auxiliary slide from its biased position to its normal position upon release of said change-balance due key thereby preventing a second depression of said change-balance due key, and abutment means on said second control slide for preventing depression of no sale key of said second set of keys when said second control means is in its second position thereby preventing depression of said no sale key until said change-balance due key has been depressed.

References Cited
UNITED STATES PATENTS

| | | | |
|---|---|---|---|
| 2,646,927 | 7/1953 | Webb | 235—130 |
| 3,072,329 | 1/1963 | Dodsworth | 235—130 X |
| 3,089,641 | 5/1963 | Fetting et al. | 235—60.13 |
| 3,129,882 | 4/1964 | Tingley | 235—130 |

STEPHEN J. TOMSKY, *Primary Examiner.*